Nov. 25, 1958 F. J. PETSCHAUER 2,861,858
PANEL MOUNT
Filed Aug. 5, 1957
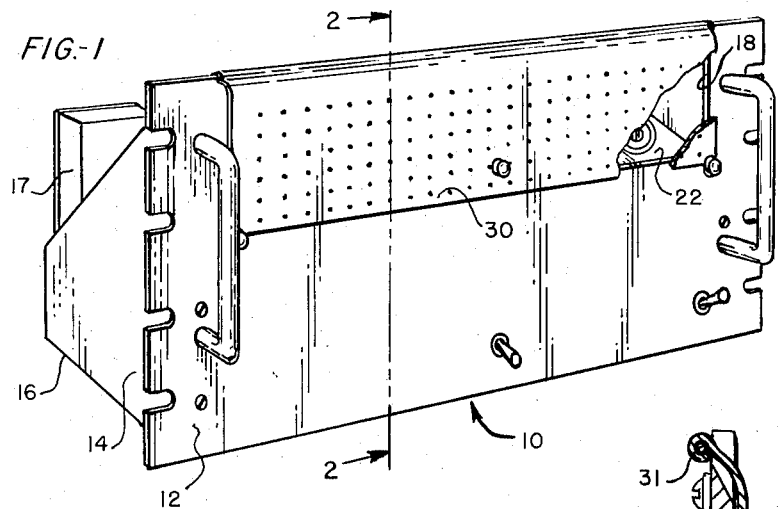
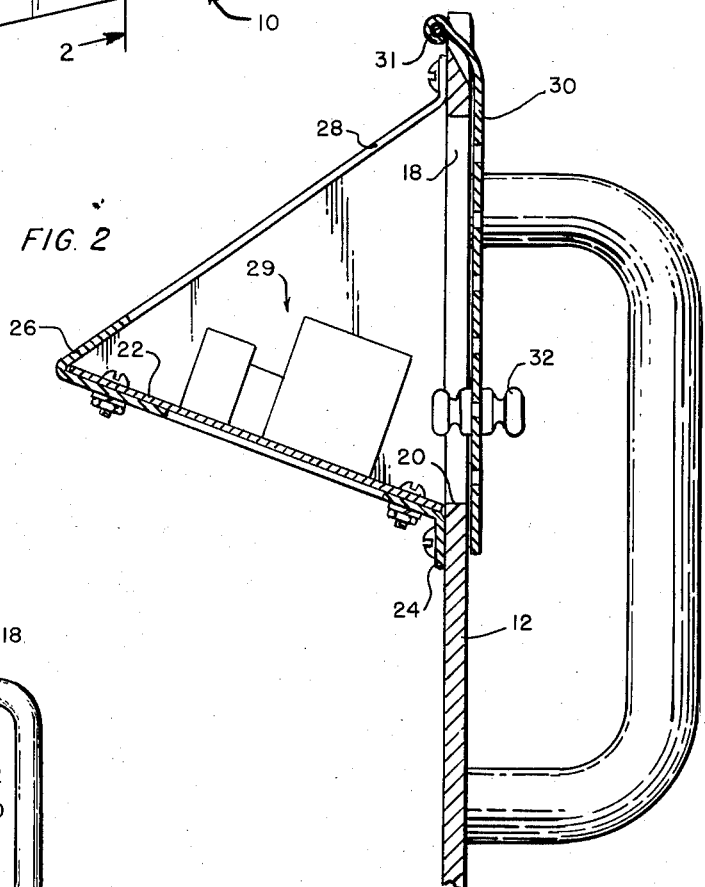
INVENTOR,
FREDERICK J. PETSCHAUER.
BY
ATTORNEY.

United States Patent Office 2,861,858
Patented Nov. 25, 1958

2,861,858
PANEL MOUNT

Frederick J. Petschauer, Monmouth Beach, N. J., assignor to the United States of America as represented by the Secretary of the Army Application August 5, 1957, Serial No. 676,449

2 Claims. (Cl. 312—283)

(Granted under Title 35, U. S. Code (1952), sec. 266)

The invention described herein may be manufactured and used by or for the Government for governmental purposes without the payment of any royalty thereon.

The present invention relates to a panel or mount, particularly adapted for the securing thereto of such items as electronic equipments wherein the requirement exists for the provision of a means for supporting a plurality of electrical connectors or the like.

In the particular embodiment hereinafter described, the panel will be described in its applicability for the support of an electronic amplifier. It is to be understood, however, that such description of the invention is not intended to limit the invention to such specific usage, as other applications will be readily apparent from a description of the device.

In the utilization of electronic equipments specific instances often arise where the same piece of equipment can be used intermittently for both field, that is portable, or standard rack use where such equipment is installed for more permanent use.

It has been found that in equipments having such dual use it was necessary to design and manufacture two distinct forms of panel mounts in which such equipments are to be confined and contained. On the other hand, if it was desired to use but one mounting for both portable field use and fixed panel use it was found necessary to design panel mounts having dual sets of control connections so as to permit accessibility to either sets of controls dependent upon the use to which the device is being subjected at any one time. In this same regard it was found that in many instances it was necessary to mount connections on both the front and rear faces of a panel to allow such equipment to be used for both field and fixed use. It is obvious that such design is cumbersome, unwieldly, provided a safety hazard in the dangling of cables, etc., and expensive to manufacture and maintain.

Accordingly, it is an object of the present invention to provide a new and novel mounting panel to which there can be secured components whereby the mounting panel can be utilized for both field and fixed use.

Another object of the invention is to provide means of making a single array of controls accessible from either the front or rear of the equipment utilizing said controls.

The above and other objects and features of the invention will be more apparent from a description of the invention where one embodiment of the invention is shown in the accompanying drawing, in which:

Fig. 1 is a view in perspective of the mounting panel with its cover plate in its closed position, Fig. 2 is a cross-sectional view of the panel taken on the line A—A of Fig. 1, and Fig. 3 is a cross-sectional view of the panel mount with the cover plate in its second open position.

Referring to the drawing, the mounting panel is shown and generally designated as 10 and comprises in part a front wall 12, rearwardly extending side walls 14 and a base or floor 16 which extends between and is supported by the walls 14. To the base 16 secured by any appropriate manner are the various boxed components required for an electronic amplifier such as, for example, input and output transformers, filter chokes, tube sockets and the like. The components are such that each of them may require electrical leads extending to a control panel or the like such as one to which other equipments such as microphones, test leads, etc. may be affixed.

As indicated above one of the primary objects of this invention is to provide a means for supporting such last named components whereby such components may be reached from either the front of the panel mount such as when used as a portable transit case mounting or from the rear of the panel when the mount is to be used in a standard fixed rack mounting. This is accomplished by providing a longitudinally disposed elongated opening 18 adjacent and proximal to the upper edge of the front wall 12. Extending from the lower edge portion 20 of the opening 18 at an angle of about 30° upwardly from the edge 20, is a rearwardly disposed platform or ledge 22 which is rigidly affixed by being secured to brackets which in turn are secured to the wall 12. One of such brackets is shown at 24. To the free edge of the platform 22 is secured a framework 26 having an opening 28 substantially coextensive with both the platform 22 and the opening 18 of the wall 14. To the platform 22 there may either temporarily or permanently be affixed any type or form of fixture such as, for example, tube sockets, fuse mounts, switches, push button controls, electrical connectors, etc. shown for convenience as a block 29 all of which may be either electrically or mechanically linked to any of the components within the apparatus that are affixed to the base 16 to the underside of the platform 22 or elsewhere. To each end of the platform 22 is affixed an angle shaped end plate.

Rotatable over the upper edge of the wall 12 about a hinge 31 is a cover plate 30 which serves as a protective cover for both of the openings 18 and 28. In Fig. 2 the cover plate 30 is shown in position when the unit is used as a fixed standard rack mounting wherein the front of the panel presents a neat continuous surface and the control board on platform 22 can be reached for manipulation through the opening 28. When the panel is desired to be used as a transit case mounting for portable field use the cover plate 30 is flipped and secured by screws or the like and assumes the position shown in Fig. 3. When so assembled access to the control panel is through the opening 18. For manipulating the cover plate 30 a dual knob 32 is provided.

I claim:

1. A panel mount for securing an array of electrical controls emanating from a plurality of electrical components wherein said controls may be reached from either the front or rear of said panel mount, and including a triangulated receptacle having at least one of its side walls open at any one determinate time, said panel mount comprising a base surface on which said electrical components are secured, a wall perpendicular to said base having an elongated longitudinally disposed opening, a ledge for said controls extending inwardly from the wall proximal to the lower edge of said opening, a housing affixed to the free end of said ledge and having a longitudinally disposed opening substantially coextensive with the opening in the wall and the ledge and a rotatable cover plate pivotably engaged at the top of said wall whereby when said cover plate is over said wall opening, entry to said electric control panel is through the opening of said housing, and when cover plate is over the housing opening entry to said electric control panel is through said wall opening.

2. A panel mount of the kind set forth in claim 1 wherein said ledge is positioned at an angle of about 30° relative to the lower edge of the opening in said wall.

References Cited in the file of this patent

UNITED STATES PATENTS

| | | |
|---|---|---|
| 1,379,228 | Swift | May 24, 1921 |
| 2,305,116 | Stamy | Dec. 15, 1942 |